United States Patent
Tarnovsky et al.

(10) Patent No.: US 6,880,752 B2
(45) Date of Patent: Apr. 19, 2005

(54) SYSTEM FOR TESTING, VERIFYING LEGITIMACY OF SMART CARD IN-SITU AND FOR STORING DATA THEREIN

(76) Inventors: George V. Tarnovsky, 3110 Fairview Park Dr., Suite 1400, Falls Church, VA (US) 22042; Christopher G. Tarnovsky, 3110 Fairview Park Dr., Suite 1400, Falls Church, VA (US) 22042

(*) Notice: Subject to any disclaimer, the term of this patent is extended or adjusted under 35 U.S.C. 154(b) by 0 days.

(21) Appl. No.: 10/414,298

(22) Filed: Apr. 16, 2003

(65) Prior Publication Data

US 2004/0206815 A1 Oct. 21, 2004

(51) Int. Cl.[7] .................................................. G06K 5/00
(52) U.S. Cl. .................... 235/382; 235/380; 235/382.5; 235/492
(58) Field of Search ................................ 235/492, 380, 235/382, 382.5, 383; 713/200; 361/737

(56) References Cited

U.S. PATENT DOCUMENTS

| | | | | |
|---|---|---|---|---|
| 5,509,076 A | * | 4/1996 | Sprunk | 380/25 |
| 5,533,123 A | * | 7/1996 | Force et al. | 713/189 |
| 5,640,002 A | * | 6/1997 | Ruppert et al. | 235/472 |
| 5,682,027 A | | 10/1997 | Bertina et al. | |
| 5,748,737 A | | 5/1998 | Daggar | |
| 5,787,101 A | * | 7/1998 | Kelly | 235/380 |
| 5,991,415 A | * | 11/1999 | Shamir | 380/30 |
| 6,108,236 A | * | 8/2000 | Barnett | 371/2.1 |
| 6,175,922 B1 | * | 1/2001 | Wang | 713/182 |
| 6,246,970 B1 | * | 6/2001 | Silverbrook et al. | 702/117 |
| 6,257,486 B1 | * | 7/2001 | Teicher et al. | 235/380 |
| 6,359,699 B1 | * | 3/2002 | Yoneta et al. | 358/1.16 |
| 6,374,354 B1 | * | 4/2002 | Walmsley et al. | 713/167 |
| 6,466,007 B1 | * | 10/2002 | Da Costa | 714/724 |
| 6,505,144 B1 | * | 1/2003 | Lapie | 235/380 |
| 6,516,445 B1 | * | 2/2003 | Genovese | 714/821 |

OTHER PUBLICATIONS

Oliver Kömmerling and Markus G. Kuho, "Design Principles for Tamper–Resistant Smartcard Processors", University of Cambridge, http://www.cl.cam.ac.uk/~mgk25/sc99–tamper[–slides].pdf, 22 pages.

(Continued)

*Primary Examiner*—Michael G. Lee
*Assistant Examiner*—Ahshik Kim
(74) *Attorney, Agent, or Firm*—Reed Smith LLP; Stanley P. Fisher, Esq.; Juan Carlos A. Marquez, Esq.

(57) ABSTRACT

A hand-held battery-operated device for interrogating and/or programming ISO7816 smart cards by means of an ISO7816 compliant card slot, in conjunction with a display, a keypad and barcode reader for data entry, a battery backup RAM for temporary storage of collected data, flash memory for storage of proprietary information provided by a smart card issuer, a RS232 port and RF link for communication with a host computer, in-system programming port for updating the flash program, all connected operatively to an internal microprocessor which perform clock or power glitching to access internal information of a smart card to determine whether the card has been tampered, compromised, and functionality.

20 Claims, 3 Drawing Sheets

OTHER PUBLICATIONS

Siu–cheung Charles Chan, "An Overview of Smart Card Security", http://home.hkstar.com/~alanchan/papers/smart-CardSecurity/, pp. 1–11.

"Answer–to–Reset", ISO/IEC 7816–3: 1989, pp. 7–8.

"Test Card Introduction", Pirates Den Test Card Introduction, http://www.pirateden.com/den/testfront.php, pp. 1–7.

Bruce Schncier and Adam Shostack, "Breaking Up Is Hard To Do: Modeling Security Threats for Smart Cards", USENIX Workshop on Smart Card Technology, Oct. 19, 1999, 12 pages.

Roman Novak, "On the Security of RSA Capable Smart Cards", ERK 2001, vol. B. pp. 135–138 (numbered pp. 1–4).

Erwin Hess, Norbert Janssen, Bernd Meyer and Torsten Schütze, "Information Leakage Attacks Against Smart Card Implementations of Cryptographic Algorithms and Countermeasures", pp. 1–10.

Lauri Karppinen, "Attacks Related to the Smart Card Used in Electronic Payment and Cash Cards", Tik–110.501 Seminar on Network Security, HUT TML 2000pp. 1–11.

Ross Anderson and Markus Kuhn, "Tamper–Resistance—a Cautionary Note", Published by USENIX Association in Nov. of 1996, pp. 1–14.

"Smartcard Security: Essential and Assurable!", Technical Product Press Announcements, pp. 1–3, www.st.com/stonline/press/news/year 1998/t138ma.htm.

* cited by examiner

SYSTEM FOR TESTING, VERIFYING LEGITIMACY OF SMART CARD IN-SITU AND FOR STORING DATA THEREIN

BACKGROUND OF THE INVENTION

1. Field of the Invention

The invention generally relates to a system for testing, and verifying legitimacy of smart card or the like and for storing data therein. In particular, the system includes a hand-held, battery-operated, free-standing device for in-situ interrogating and/or programming smart cards by means of a card slot.

2. Description of the Related Art

Smart cards are expected to be a part of the information infrastructure of the future for everything from banking to telecommunications to retail. For example, worldwide, millions of smart cards are issues by the satellite television industry for conditional access and security. More than 210,000 contact-less smart cards called SmarTrip® have been issued to Metro® subway and commuter train riders in the Washington, D.C. and Northern Virginia area, each of which can store up to $200 value. The riders simply wave the cards, or the wallets/pockets containing the cards within 10 centimeters of the front side of a turnstile reader.

Smart cards are generally referred as a class of credit card-sized devices with varying capabilities, such as stored-value cards, contact-less cards, and integrated circuit cards (ICC). The circuitry in a smart card derives power from a smart card reader after the card is inserted into the reader. It includes pay-TV smart cards, prepayment meter tokens, remote locking devices for cars and mobile phone SIM cards. For example, Access Cards issued by Satellite TV distribution for providing certain programming to certain households has memory stored with data which determines what programs can be de-scrambled, and what programs cannot. The card is technically known as a Conditional Access Module (CAM). Data communication between a smart card and an application running on a computer is performed over a half-duplex serial interface managed by the smart card reader and its associated device driver. Smart card readers are either connected to a computer or communicating with the computer wirelessly.

The physical structure of a smart card is specified by the International Standards Organization (ISO) 7810, 7816/1, 7816/2 and 7812/3 which includes a printed circuit and an integrated circuit chip embedded a plastic card (dimensions of 85.60 mm×53.98 mm×0.80 mm). The capability of the smart card is decided by the integrated circuit chip which consists of a microprocessor, read only memory (ROM), non-static random access memory (RAM) and electrically erasable programmable read only memory (EEPROM). EEPROM stores the secret of the cryptographic algorithm, the keys stored, and the access control inside the smart card such that it becomes the targets of attackers. A physical interface allows data exchange between the integrated circuit chip and the card acceptor device (CAD). All the data exchanges are under the control of the central processing unit in the integrated circuit chip.

The confidentiality and integrity of all information stored on a smart card shall be ensured to protect the privacy of the cardholders and the business interests of the card issuers against fraud perpetrated by malicious cardholders, card thief, and commercial pirates. So far, commercial pirates have cost digital TV industry hundreds of millions of dollars. Smart cards in general are vulnerable to a variety of attacks, such as attacks via a terminal against a cardholder or attacks by a cardholder against a card issuer.

To combat attacks by a terminal against a cardholder, systems use software-only solutions, such as interactive logon, client authentication, and remote logon to verify smart cards. This approach requires signal transition to a remote computer, which is subject to interception.

The attacks by a cardholder, including a commercial pirate, against a card issuer may be classified into two categories: invasive attacks (physical attacks) and non-invasive attacks. Physical attacks, such as microprobing, access the chip surface directly to observe, manipulate, and interfere with the IC. For example, the circuit chip is tempered by removing its circuitry from the plastic card by a knife to cut away the plastic behind the chip module until the epoxy resin becomes visible, dissolving the resin by a few drops of fuming nitric acid, washing the acid and the away by acetone until the silicon surface is fully exposed. To read out EEPROM contents, microprobe techniques or circuitry reverse engineer can be applied. The security lock bit is erased by focusing UV light on the EEPROM, probing the operation of the circuit with microprobing needles, or using laser cutter microscopes to explore the chip. The techniques described above have been successfully applied by amateur pay-TV hackers, students and others with limited resources. Some of the techniques available in professionally equipped semiconductor laboratories.

Non-invasive attacks are custom-prepared for a specific processor type and software version to reproduce the information within seconds on another card of the same type. The attacked card is not physically harmed and the equipment used in the attack is usually disguised as a normal smart card reader. There are a lot of non-invasive attacks on particular designs, such as raising the supply voltage above its design limit, cutting the supply voltage below its design limit, exploiting design weaknesses in the hardware (including the manufacturer supplied ROM code), exploiting misfeatures in the EEPROM code, or their combinations. These non-invasive attacks are categorized in three groups, as disclosed in an article by Siu-cheung Charles Chan: 1. Logical attacks on the communication interface of the processor by exploiting security vulnerabilities found in the protocols, cryptographic algorithms, or their implementation. 2. Monitoring information with high time resolution to figure out the analog characteristics, such as power, current, of all supply and interface connections and any other electromagnetic radiation produced by the processor during normal operation. 3. Glitching by generating malfunction or confusion in the processor to provide additional access.

Non-invasive attacks are particularly dangerous in some applications because the owner of the compromised card might not notice that the cryptographic keys have been stolen, therefore it is unlikely that the compromised keys will be revoked before any abuse. On the other hand, invasive techniques require very little initial knowledge and usually work with a similar set of techniques on a wide range of products. Attacks therefore often start with invasive reverse engineering, the results of which then help to develop cheaper and faster non-invasive attacks.

In addition to the attacks on satellite TV, there have been a number of attacks on banking systems, telephone systems, and prepayment electricity meter systems. Most of the attacks documented there resulted from similarly opportunistic exploitation of design and operational errors, and some of the target systems were based on smart cards. As a consultant to some high-tech companies, the inventor has witnessed numerous successful attacks based on smart cards by commercial pirates on pay-TV systems via intentional clock and power supply glitches, which can often cause the execution of incorrect instructions by the smart card and offer access to data.

A microprocessor is basically a set of a few thousand flip-flops (registers, latches, etc.) that define its current state, and additional combinatorial logic that calculates from the current state the next state during every clock cycle. Some analog effects in such a system can be glitched. Power and clock transients are used in some processors to affect the decoding and execution of individual instructions. Glitching is basically momentarily dropping the electrical voltage being applied to the card at some point to bypass certain security areas on the card designed for keeping the EEPROM or ROM code secure. In a glitch attack, a malfunction is deliberately generated to cause the wrong state such that a single critical machine instruction is replaced with an arbitrary instruction. A glitch increases the program counter as usual but transforms either the conditional jump or the loop variable decrement into something else. Conditional jumps create windows of vulnerability in the processing stages of many security applications that often allows the pirates to bypass sophisticated cryptographic barriers by simply preventing the authentication execution of the code. Glitches can also aim to corrupt data values as they are transferred between registers and memory.

A clock glitch or a power glitch will affect only certain transistors in the chip. Since the pirates do not know in advance which glitch will cause wrong instructions in a specific chip, they have to find the information by a systematic search (trial-and-error) with a computer and other equipment. With the timing information, they then can reprogram legitimate digital satellite TV access cards with an ISO-7816 card programmer to allow the cards to "test" all channels available. There are a several websites marketing the tempered cards or equipment to temper legitimate access cards.

A card issuer in the digital TV industry can randomly launch an electronic countermeasure (ECM), i.e., an electronic signal sent down from the satellite to shut down or damage access cards such that the tempered cards can no longer authorize all channels. ECM's are type or brand specific, i.e., targeted against a particular type or brand of card. ECM's are usually based from a software analysis of the tempered cards and then the weaknesses are exploited in an ECM.

During a field investigation, fraudulent and legitimate smart cards are found and confiscated. These cards require interrogation to determine their legitimacy. In some cases, only limited access to evidence is allowed. A tool for easy and fast identification, verification of legitimacy, collection and storage of data is required.

Most hand-held smart card readers or authentication devices have limited memory and processing resources such that they have to be connected or wirelessly communicating with a computer or other external equipment to operate. For example, it may require a device to provide and supply operation or user data information. These limitations may degrade the security of the device in some circumstances as the external elements are unavailable, un-trusted or precarious. U.S. Pat. No. 5,682,027 shows a system and method for performing transactions and a portable intelligent device therefore. This patent also shows a portable ISO 7816 compliant device that has backup RAM and a display (FIG. 1; abstract). In addition, the system provides different access restriction levels. U.S. Pat. No. 5,748,737 shows a multi-media electronic wallet and generic card. This patent also shows a handheld, ISO 7816 compliant device (abstract).

Currently, there is a demand for a hand-held, battery-operated, free-standing smart card authentication device for in-situ interrogating and/or programming smart cards by means of a card slot.

SUMMARY OF THE INVENTION

It is a purpose of this invention to be hand-held, free-standing smart card authentication device for in-situ interrogating.

It is another purpose of this invention to provide a system for interrogating ISO 7816 smart cards thereby determining their legitimacy, identification, and functionality.

It is still another purpose of this invention to answer to persistent requests of cared issuers for a hand-held, free-standing smart card authentication device for in-situ interrogating.

DESCRIPTION OF THE DRAWINGS

The foregoing and additional features and characteristics of the present invention will become more apparent from the following detailed description considered with reference to the accompanying drawings in which like reference numerals designate like elements and wherein.

DESCRIPTION OF THE PREFERRED EMBODIMENTS

Figure 1:
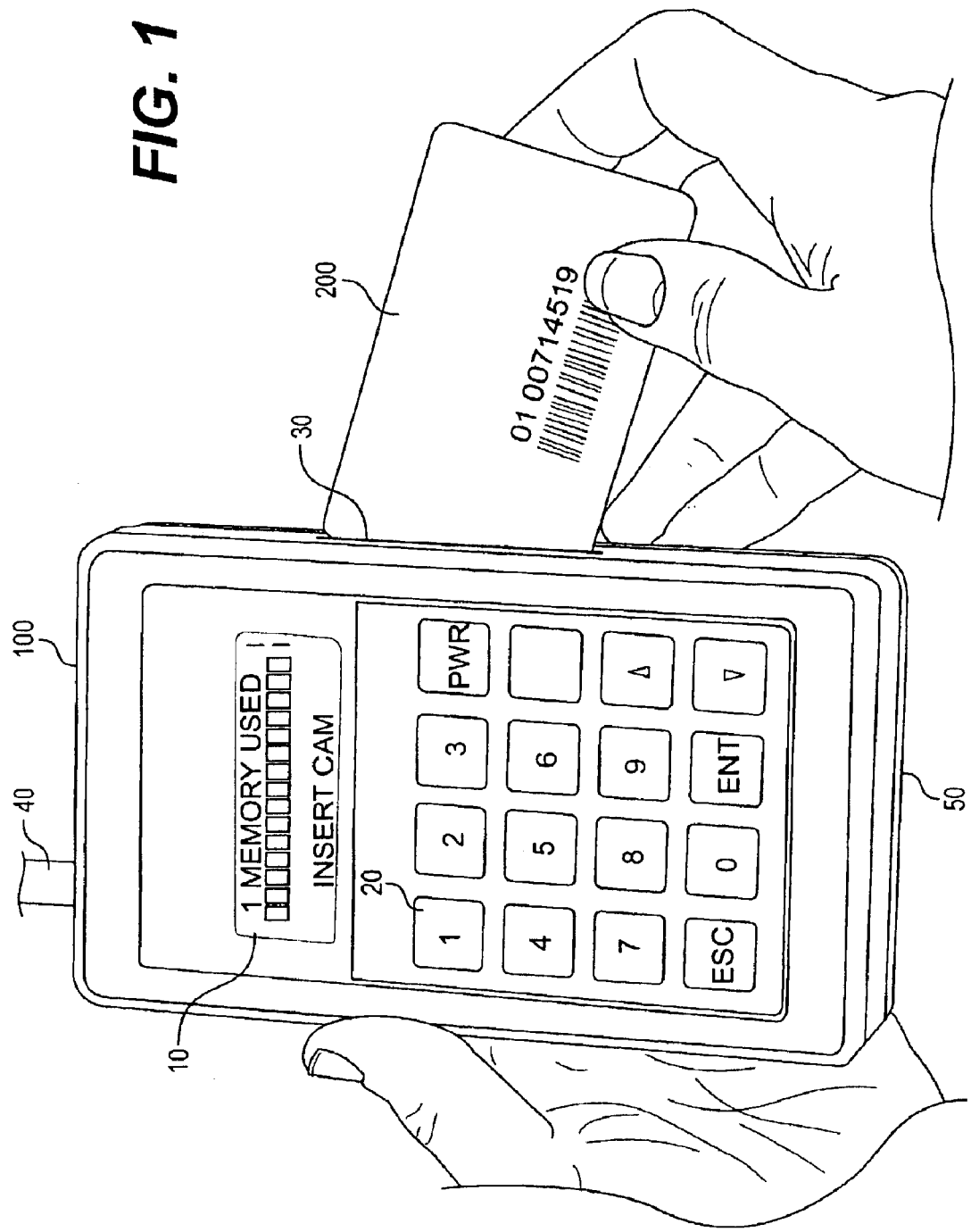
FIG. 1 shows a hand-held, in-situ, free-standing smart card authentication device according to the invention.
Figure 2:
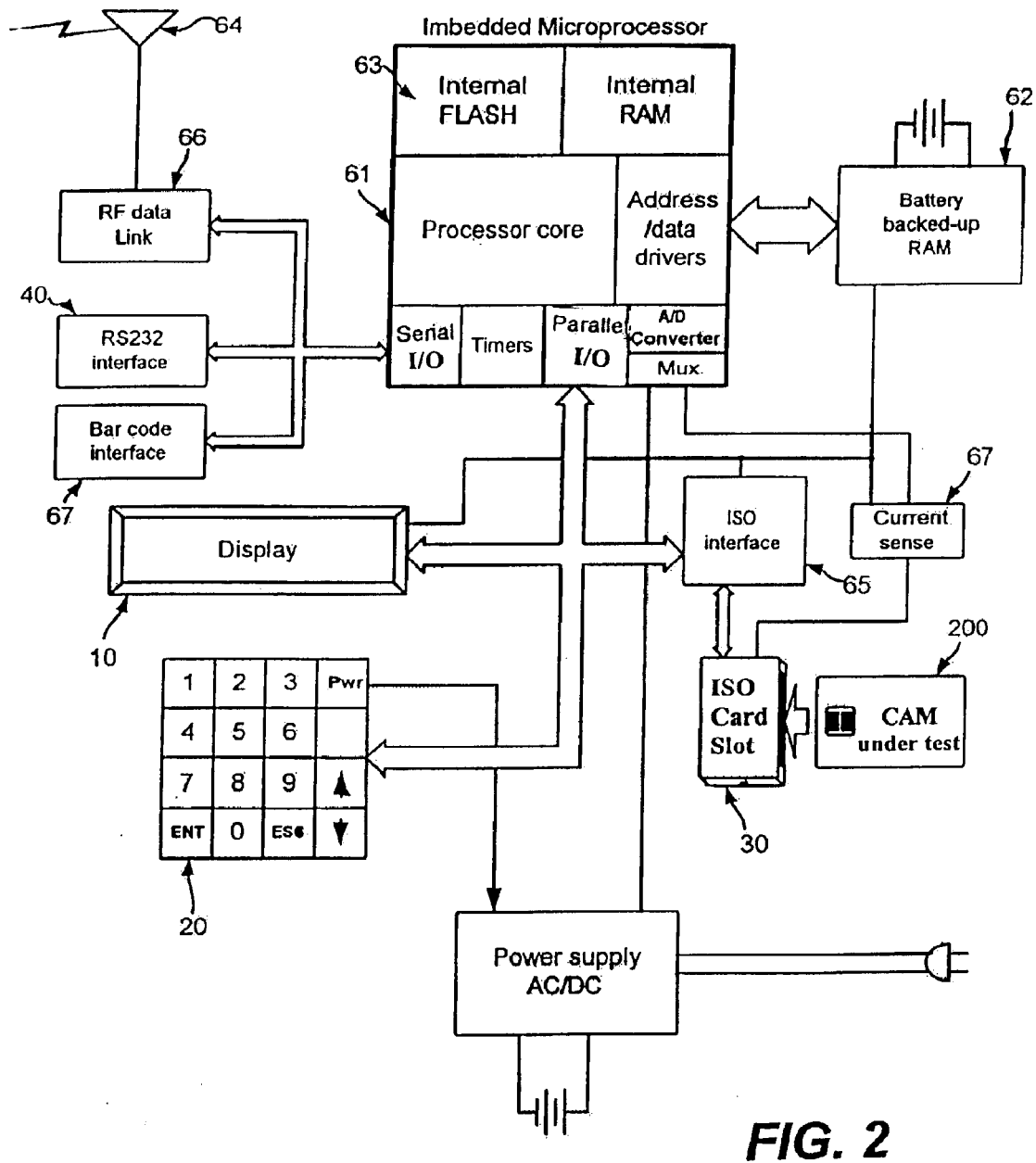
FIG. 2 is a block diagram showing one embodiment of the hardware structure of the authentication device shown in FIG. 1.

With reference to the figures, like reference characters will be used to indicate like elements throughout the several embodiments and views thereof. FIG. 1. The CAMID™ 100 as shown in FIG. 1 is a stand-alone, battery-operated, hand-held device for interrogating any ISO 7816 compliant Conditional Access Module (CAM) 200. The CAMID™ 100 allows investigators to immediately sort CAMs by category, i.e., valid, defective, or tampered. During the interrogation, data is collected and sorted without additional hardware (stand-alone). The CAMID™ 100 comprises a LCD screen 10, a key pad 20, a CAM slot 30, an antenna 64, a housing case 50, and a microprocessor 61. FIG. 2 shows the CAMID™ 100 and the component blocks of the microprocessor 61, including a battery backed-up RAM 62, a flash memory 63, a RS-232 port 40, an ISO card port 30, Bar code interface 67, a current processing means (not shown), etc. The CAMID™ 100 is battery-powered, and it instantly displays CAM information as directed by an investigator via the key pad 20.

The key of the invention is the information for clock or power glitching provided by card issuers, such as which glitch will cause wrong instructions in a specific CAM. With the information, the CAMID™ 100 does not need to perform a systematic search (trial-and-error) with a computer and other equipment as the pirates to find out the information in order to create a glitch to bypass authentication. Accordingly, the CAMID™ 100 can perform its interrogation function in a hand-held size and free-standing manner. As mentioned, the circuit board 60 includes a current processing means 67, which determines if the card is good or defective based upon the current drawn by the card. For example, assuming a card draws about 5 milli amps normally, a slightly higher current on this card indicates a defect or tempered with by a pirate. The current processing means can be implemented via an A/D converter encompassed within the microprocessor. Alternatively, a power processing means is used to control the on and off of Vcc power which can be implemented via an integrated device like a Power transistor that can withstand characteristic demands, a discreet logic, or any other means known to one skilled in the art. Characteristic demands. The characteristic demands include speed and current demand.

The operation of the CAMID™ 100 is based upon a custom-developed software stored therein. The software displays user-friendly menus to guide the investigator to read, sort, and identify tampered CAMs in a manner that it allows flexible examination of CAMs without compromising the integrity of collected evidence. The flash memory 63 internal to the processor allows for in-field software upgrades. The CAMID™ 100 time-stamps and sequences all its internal records such that data may be easily sorted and viewed on the LCD screen 10. The in-situ collected data may also be saved in the RAM 62 to be downloaded to a host using the RS-232 port 40 or the RF data link 66. The in-system programming port 66 is used for updating the program. The CAMID™ can store data of over three thousand eight hundred CAMs, or seventy eight complete images, or any combination until the RAM 62 is 100% full. Once the RAM 62 is full, or interrogation is completed, the data may be downloaded to a host computer (e.g. a laptop computer) so as to release the RAM 62 for the next series of examinations. An integral lithium battery provides 10 years data retention of RAM memory if a host is not available. The host computer uses a custom software, such as CLINK.exe, to parse the downloaded data.

RAM is preferred for data collection than ROM, PROM, FLASH, EPROM, or EEPROM because of it's unlimited read/write ability and speed.

During a field investigation, confiscated CAMs are interrogated using several CAMID™s. Upon request as programmed, the microprocessor 61 interrogates the smart card for appropriate responses. The results is presented on the display 10, such as: 1) The CAM service type; (2) The condition (electrically good, bad, looped); and or (3) Whether a CAM is legitimate, intact or tempered.

Based on the answers received by the system, the pertinent data will be saved in battery backed-up RAM for later download or review. A keyboard is provided for entry of data, turning power on/off, and maneuvering through and selecting various menu options. An RS-232 40 or RF link port 66 is provided for connecting to a host computer used for data retrieval and system parameters upload. In-system programming (ISP) port is provided for loading internal FLASH and EEPROM of said microprocessor.

Figure 3:
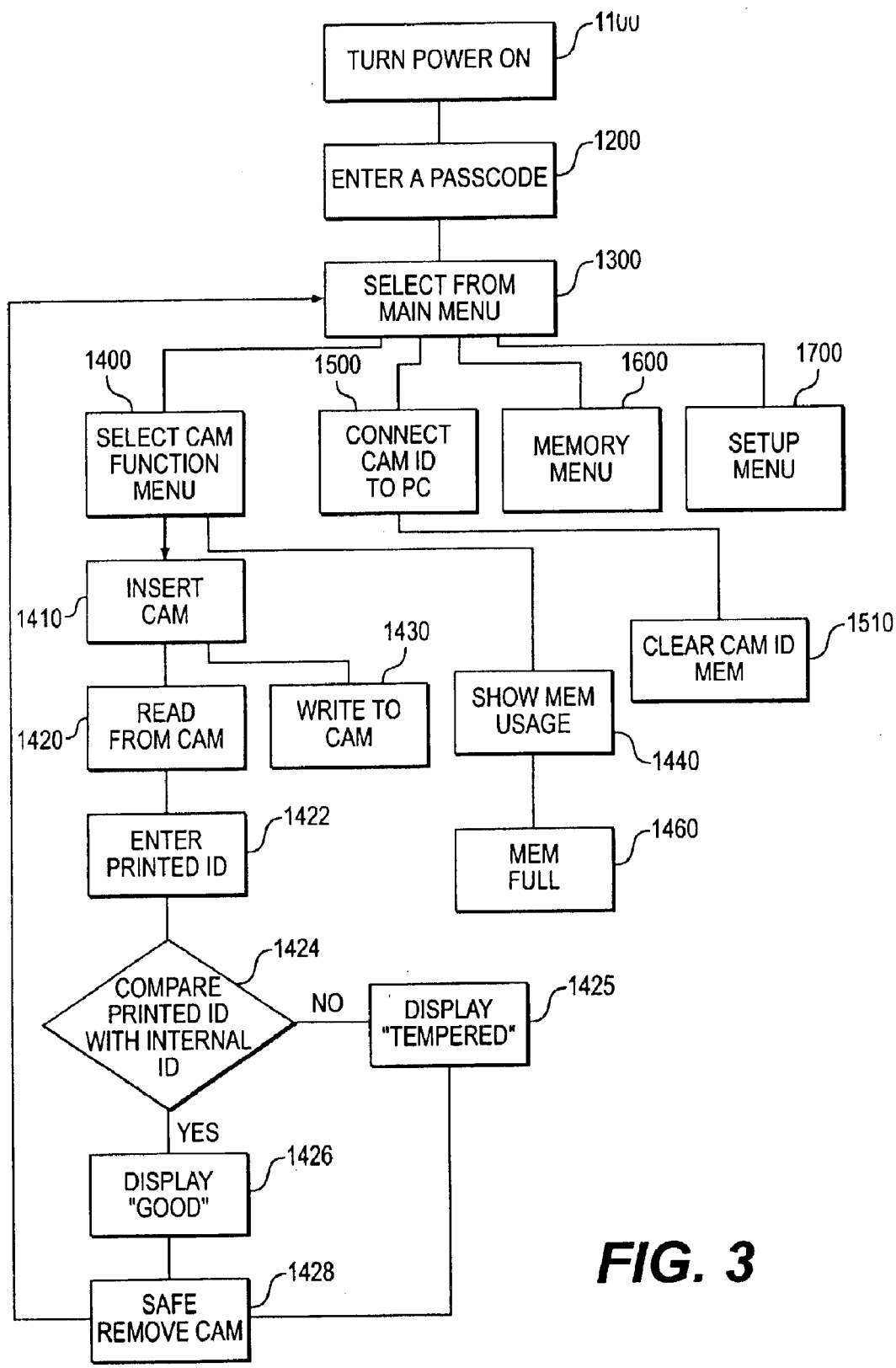
FIG. 3 is an operation flow chart of the authentication device shown in FIG. 1.

According to the flow chart in FIG. 3, the user first turns on the CAMID™ 100 power (Step 1100) by pressing the "Pwr" button on the keypad 20 until hearing the power-up chime. Once power is on, the CAMID™ 100 displays "Property of XXX corp. /Enter code" prompting the user to enter a pass code (step 1200). The user enters a correct pass code (step 1200) followed by pressing the "Ent" button. The CAMID™ 100 displays board, firmware versions and date/time. The CAMID™ 100 displays the main menu after the user presses any button (except "Pwr") to continue.

MAIN MENU
1. CAM Functions
2. Connect to PC
3. Memory menu
4. Setup menu

If the user selects Option #1 "CAM function." from the main menu (step 1300), the CAMID™ 100 displays "Insert CAM" prompting the user to insert a smart card in to the slot 30 (step 1410). The CAM shall be placed with ISO connector facing up, which allows to view the actual printed ID without removing the CAM There are two ways to make a menu selection. The user can directly enter the number of selection using the keypad (#1 for this purpose) or use the "arrow" buttons to navigate the cursor (flashing block) to the required selection, then press the "Ent" button to finalize the selection. At any time, the "Esc" button can take the user back to the previous menu and/or cancel the command.

CAM function MENU
1. Read from CAM
2. Write to CAM
3. Show Mem Usage

If the user enters #1 to select, the microprocessor 61 initializes the card and requests pertinent data to be sent, such as answer to reset (ATR). Further, the system checks for electrical health by means of current measurement (step 1420). If the inserted smart card current is within the programmed parameters, the microprocessor 61 expects an answer to reset (ATR) to be returned by the inserted smart card. This answer is compared to the systems internal stored database. Judging by the returned answer, the system determines the identity of the inserted smart card. The system further checks pertinent data to determine correctness of answers to queries and other programmed parameters provided by the system internal database. The user is prompted audibly to view answers received from the inserted smart card. Information is displayed on the system's display. The user is prompted to enter the identification printed of the inserted smart card either by the system keypad 20 or barcode scanner 67 (step 1422). The system compares the printed identification on the inserted smart card with the displayed data (step 1424).

If the identification displayed is the same as the data retrieved from the smart card, and the other tests pass, the system displays "good" and saves the ID number in the RAM 62 (step 1426). However, if the identification proves to be different, the system will display "tempered"(step 1425). The pertinent data is now saved in the system internal battery-backed-up-memory. Once the data has been saved the CAMID™ displays "Safe-remove CAM." (step 1428). The CAM may be removed. Additional CAMS may be interrogated until all CAMS are read. After the interrogation has completed, the user may upload the collected data to a host PC using the RS232 or RF link ports.

The user may program or update the CAM by selecting "Write to CAM" from the menu (step 1430). Information in memory will be written to the CAM. As additional smart cards are interrogated data is saved, memory usage may be viewed on the system display (Step 1440).

If the memory is filled, the system notifies the user audibly and displays a message in the system display (step 1460). Once the memory is filled, the data must be uploaded to a host computer using the systems internal RS-232 port 40 or the RF link 66 by selecting "Connect to PC" and pressing any button on the key pad 20 (step 1500). After uploading the data, the user may select to erase the RAM memory to release for use again (step 1510). Alternative, the user may at any time select to upload the stored data to a host computer.

The display 10 can be replaced by a vacuum florescent display. Since the CAMID™ 100 is software-driven device, the parameters for interrogation, a ISO 7816 compliant ATR (answer to reset) comparison table, commands, and appropriate responses, can all be added and altered, as needed to cope with new techniques developed by pirates. The application of CAMID™s is not limited to the satellite Industry. Virtually, any smart cards adopting the ISO7816 standard can be interrogated according to the invention. The flexibility of the CAMID™ allows identifying the ATR from the ISO card 65, subsequently identifying the card. The CAMID™'s internal firmware can be programmed for additional services and new functions. If new services are needed or changes to existing services are required, proprietary CAM information may be added to the flash memory 63.

The principles, preferred embodiments and modes of operation of the present invention have been described in the foregoing specification. However, the invention which is intended to be protected is not limited to the particular embodiments disclosed. The embodiments described herein are illustrative rather than restrictive. Variations and changes may be made by others, and equivalents employed, without departing from the spirit of the present invention. Accordingly, it is expressly intended that all such variations, changes and equivalents which fall within the spirit and scope of the present invention as defined in the claims, be embraced thereby.

What is claimed is:

1. A smart card authenticating device, comprising:
   a hand-held sized housing;
   a slot for inserting a to-be-interrogated smart card;
   a storage medium stored with clock or power glitching timing information provided by a smart card issuer; and
   means for glitching clock or power in the smart card based upon said timing information, independent of any collaborating or communicating with any external computer system or equipment, to bypass authentication by a processor of the smart card via generating malfunction or confusion in the processor of the smart card to provide additional access thereinto;
   means for interrogating the glitched smart card to compare a response from the glitched smart card to interrogation so as to determine whether the smart card is issued by the issuer,
   wherein said device operates in a hand-held, in-situ, and free-standing manner.

2. The device according to claim 1, further comprising a display for displaying menus or instructions.

3. The device according to claim 1, further comprising a key pad.

4. The device according to claim 1, further comprising a smart card receiving slot.

5. The device according to claim 1, further comprising an antenna for wireless communication between the device with an external host PC.

6. The device according to claim 5, wherein in the external device is a in-situ computer.

7. The device according to claim 1, wherein the storage medium is one of a RAM, ROM, PROM, FLASH, EPROM, and EEPROM.

8. The device according to claim 1, further comprising a housing case.

9. The device according to claim 1, further comprising a microprocessor for executing current or power glitching on the smart card thereby determining whether a smart card has been tampered with.

10. The device according to claim 1, further comprising an in-system programming port.

11. The device according to claim 1, wherein said information includes at least one of an answer to reset, a communications protocol, an entry point, and current profile.

12. The device according to claim 1, wherein the storage medium is one of a battery backed-up RAM.

13. A method for conducting smart card authentication in a hand-held, in-situ, and free-standing manner, comprising:
    providing a hand-held smart card authenticating device with a hand-held sized housing, a storage medium and a smart card receiving slot;
    storing current or power glitching timing information provided by a smart card issuer in the storage medium;
    inserting the smart cart into the smart card receiving slot;
    executing clock or power glitching on the smart card via the device based upon said timing information, independent of any collaborating or communicating with any external computer system or equipment, to bypass authentication by a processor of the smart card via generating malfunction or confusion in the processor of the smart card to provide additional access thereinto; and
    interrogating the glitched smart card to compare a response from the glitched smart card to interrogation so as to determine whether the smart card is issued by the issuer or whether the smart card has been tampered with.

14. The method according to claim 13, further comprising steps of retrieving an internal ID stored in the smart card; and determining whether the retrieved internal ID is identical with an ID printed on the smart card thereby determining whether the smart card has been tampered with.

15. The method according to claim 14, wherein the retrieving step occurs after the glitching step or a normal communications query.

16. The method according to claim 13, further comprising a step of measuring an operational current of the smart card; and determining whether the current is within normal operating range of a corresponding current value provided by a smart card issuer thereby determining whether the smart card is functional, defective, or tampered with.

17. The method according to claim 14, further comprising a step of storing the retrieved internal ID of the smart card under test in the storage medium.

18. The method according to claim 14, further comprising a step of storing information of the smart card and uploading the information to an external apparatus.

19. The method according to claim 13, further comprising a step of re-programming the smart card.

20. The method according to claim 13, further comprising a step of glitching a power or clock of the smart card at a specified point to gain access to the smart card.

* * * * *

UNITED STATES PATENT AND TRADEMARK OFFICE
Certificate

Patent No. 6,880,752 B2

Patented: April 19, 2005

On petition requesting issuance of a certificate for correction of inventorship pursuant to 35 U.S.C. 256, it has been found that the above identified patent, through error and without any deceptive intent, improperly sets forth the inventorship.

Accordingly, it is hereby certified that the correct inventorship of this patent is: George V. Tarnovsky, Falls Church, VA (US); Christopher G. Tarnovsky, Falls Church, VA (US) and John C. Norris, Costa Mesa, CA (US).

Signed and Sealed this Nineteenth Day of September 2006.

MICHAEL G. LEE
*Supervisory Patent Examiner*
Art Unit 2876